US012618494B1

(12) United States Patent
Chen et al.

(10) Patent No.: US 12,618,494 B1
(45) Date of Patent: May 5, 2026

(54) SEALING WORKPIECE AND VACUUM TESTING EQUIPMENT

(71) Applicant: Fulian Precision Electronics (Tianjin) Co., LTD., Tianjin (CN)

(72) Inventors: Chih-Wei Chen, New Taipei (TW); Chang-Hsien Chen, New Taipei (TW); Wei-Ting Chien, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 19/091,486

(22) Filed: Mar. 26, 2025

(30) Foreign Application Priority Data

Dec. 12, 2024 (CN) ........................ 202423062711.X

(51) Int. Cl.
*F16L 5/02* (2006.01)
*B01L 1/02* (2006.01)

(52) U.S. Cl.
CPC ...... *F16L 5/02* (2013.01); *B01L 1/02* (2013.01); *B01L 2300/046* (2013.01); *B01L 2300/0858* (2013.01)

(58) Field of Classification Search
CPC .............................. B01L 1/02; B01L 2300/046
See application file for complete search history.

(56) References Cited

U.S. PATENT DOCUMENTS

2022/0025972 A1* 1/2022 Cheng .................... F16J 15/061

FOREIGN PATENT DOCUMENTS

| CN | 207556776 U | * | 6/2018 | |
|---|---|---|---|---|
| CN | 213121010 U | * | 5/2021 | |
| CN | 213585014 U | * | 6/2021 | |
| CN | 216045873 U | * | 3/2022 | |
| CN | 216978166 U | * | 7/2022 | |
| CN | 219254474 U | * | 6/2023 | |
| CN | 220797740 U | * | 4/2024 | |
| CN | 221612313 U | * | 8/2024 | |
| WO | WO-2025131697 A1 | * | 6/2025 | ........... H05G 2/0035 |

OTHER PUBLICATIONS

Translation of CN-213585014-U (Year: 2021).*

* cited by examiner

*Primary Examiner* — Jacob J Cigna
(74) *Attorney, Agent, or Firm* — ScienBiziP, P.C.

(57) ABSTRACT

A sealing workpiece applied to a piece of vacuum testing equipment is provided, including a first cover, including a mounting portion and a joint portion integrally formed with the mounting portion, the mounting portion is mounted to the vacuum testing equipment, the mounting portion includes a first opening closing to the vacuum testing equipment, and communicated with an external connection hole of the vacuum testing equipment, the joint portion includes a second opening communicated with the first opening; a second cover, the first cover is connected to the second cover through the joint portion; when the first cover and the second cover are connected, the first cover and the second cover engage to form a third opening communicating with the first opening, the third opening is away from the vacuum testing equipment, a diameter of the third opening is less than a diameter of the first opening.

16 Claims, 8 Drawing Sheets

SEALING WORKPIECE AND VACUUM TESTING EQUIPMENT

CROSS-REFERENCE TO RELATED APPLICATIONS

This application claims priority to Chinese Patent Application No. 202423062711.X filed on Dec. 12, 2024, in China National Intellectual Property Administration, the contents of which are incorporated by reference herein.

FIELD

The subject matter herein generally relates to field of testing equipment technology, particularly to a sealing workpiece and a vacuum testing equipment.

BACKGROUND

In reliability testing, high altitude and vacuum testing are common test items, and both high altitude and vacuum testing can be performed in a piece of vacuum testing equipment. In some testing processes, the items to be tested need to be tested at high altitude or in a vacuum when the device is turned on. It is often necessary to connect the items to be tested in the vacuum testing equipment with a piece of peripheral equipment outside the vacuum testing equipment to obtain various test parameters of the items to be tested through the peripheral equipment. The vacuum testing equipment is usually provided with an external connection hole, and wires can be used to connect the items to be tested in the vacuum testing equipment with the peripheral equipment outside the vacuum testing equipment via the external connection hole.

In order to improve the accuracy of the test, after the items to be tested are connected to the peripheral equipment, the external connection hole needs to be sealed. To seal the external connection hole, the method commonly used in the relevant technology is: using a sealing strip to seal the external connection hole, and then using specialized clay to fill and seal the wire located at the external connection hole. However, in the above described method, filling the clay or removing the clay cannot be completed in one go, which is time-consuming and labor-intensive. In addition, in some more stringent test environments, when the material strength of the clay is not enough to support the vacuum pressure, the clay often collapses and be sucked into the vacuum testing equipment, resulting in a vacuum leakage problem, which, in turn, affects the test efficiency of the items to be tested.

BRIEF DESCRIPTION OF THE DRAWINGS

Implementations of the present disclosure will now be described, by way of embodiments, with reference to the attached figures.

DETAILED DESCRIPTION

Figure 1:
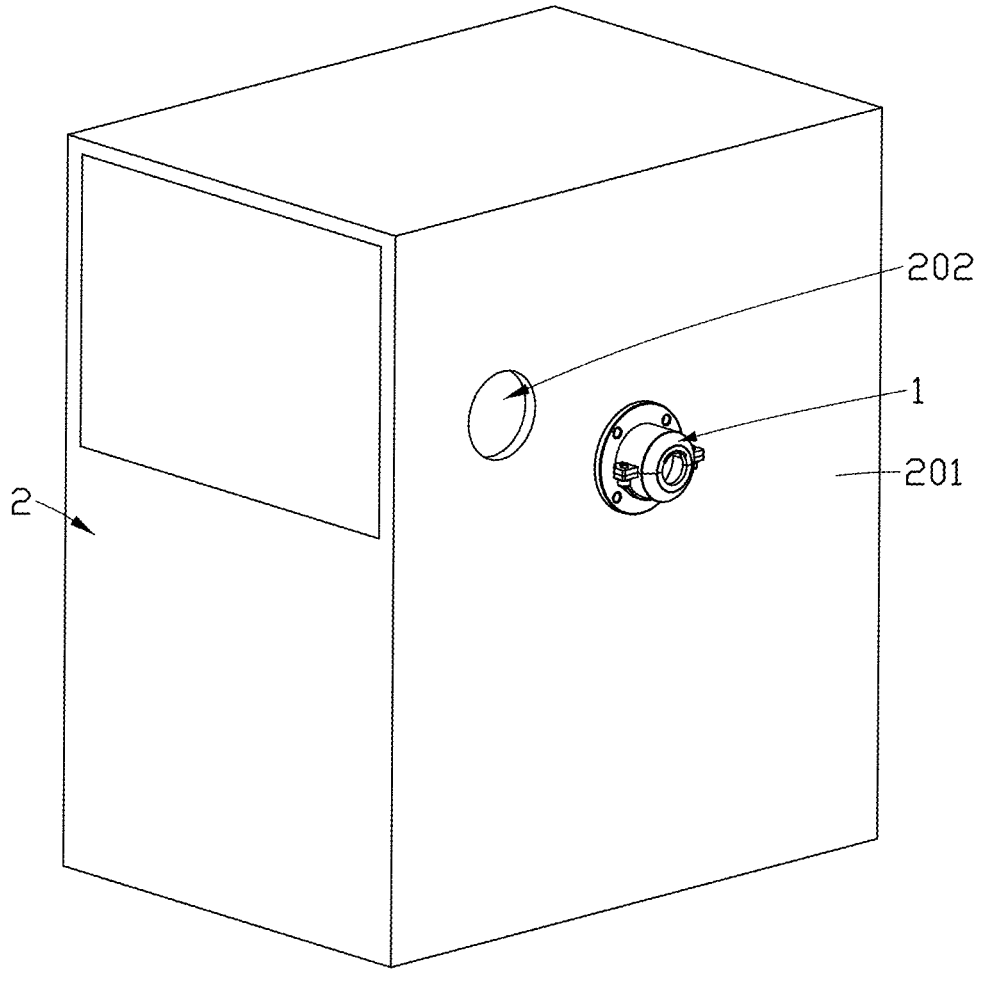
FIG. 1 is a schematic diagram of an application scenario of a sealing workpiece and a vacuum testing equipment according to an embodiment of the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

In reliability testing, high altitude and vacuum testing are common test items, the high altitude testing can simulate the performance parameters of the object to be tested after falling from the air, and vacuum testing can simulate the performance parameters of the object to be tested in a vacuum or low pressure environment. Sometimes, both the high altitude and the vacuum testing can be performed in vacuum testing equipment. The vacuum testing equipment is mainly used to provide a vacuum or low pressure environment.

In some testing processes, the items to be tested need to be tested at high altitude or in a vacuum when the device is turned on. At this time, it is often necessary to connect the items to be tested in the vacuum testing equipment with peripheral equipment outside the vacuum testing equipment to obtain various test parameters of the items to be tested through the peripheral equipment, for example, the electrical parameters, withstand voltage values, and temperature values of the item to be tested in a vacuum or low-pressure environment can be obtained through peripheral equipment such as an electrical parameter monitoring device, a pressure monitoring device, and a temperature monitoring device. The vacuum testing equipment is usually provided with an external connection hole, and wires can be used to connect the items to be tested in the vacuum testing equipment with peripheral equipment outside the vacuum testing equipment via the external connection hole.

In order to improve the accuracy of the testing, after the item to be tested is connected to the peripheral equipment, the external connection hole needs to be sealed to ensure that the vacuum testing equipment can provide the required vacuum or low-pressure environment. The method commonly used in the relevant technology is: use a sealing strip (such as a rubber strip) to seal the external connection hole, and then use special clay to fill and seal the wire located at the external connection hole, thereby completing the sealing of the external connection hole. However, in this method, since there may be a large number of wires, the process of filling or removing the clay cannot be completed in one go, making the entire test process time-consuming and labor-intensive. In addition, in some more stringent testing environments, since the clay itself is relatively soft, when the pores are relatively large, the material strength of the clay is not enough to support the vacuum pressure, which often causes the clay to collapse and be sucked into the vacuum testing equipment, resulting in vacuum leakage problems, which in turn affects the test efficiency of the items to be tested. Based on this, the embodiments of the present application provide a sealing workpiece, which can reduce an amount of the clay used when the vacuum testing equipment is connected to the peripheral equipment and the vacuum leakage problem that may be caused when using the clay, thereby improving a testing efficiency of the vacuum testing equipment. Some embodiments will be described below in conjunction with the accompanying drawings. The following embodiments and features in the embodiments can be combined with each other without conflict.

Figure 2:
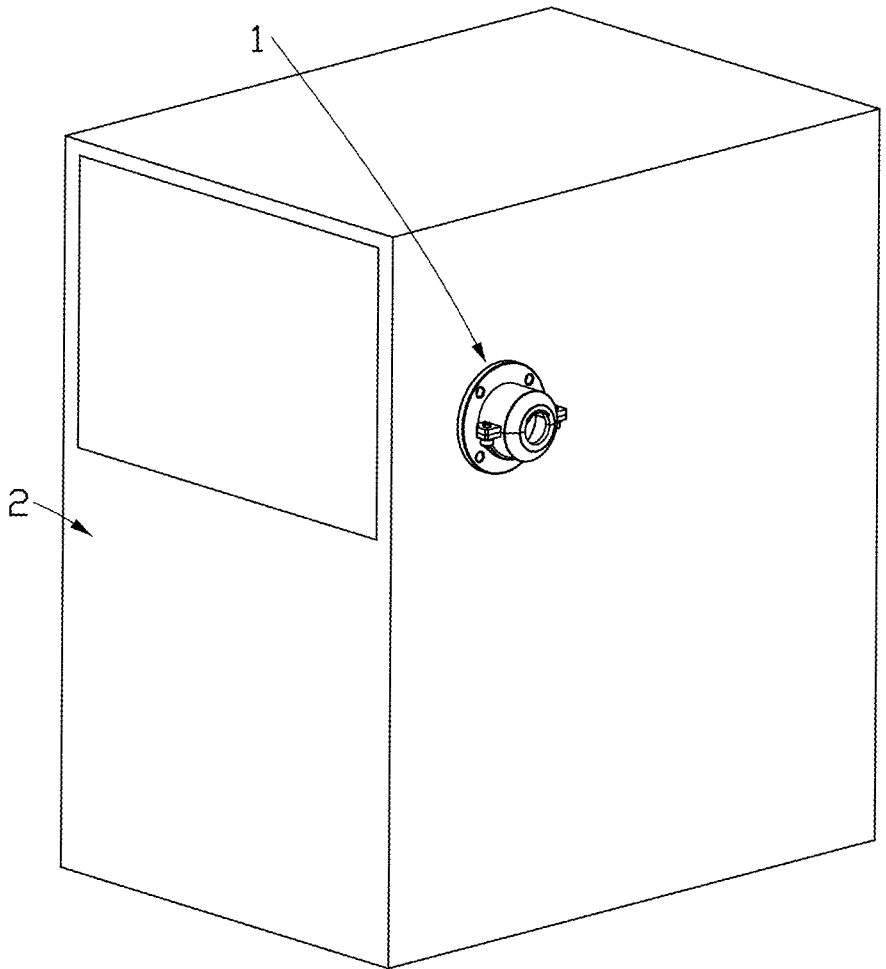
FIG. 2 is a schematic diagram of an application scenario of the sealing workpiece according to an embodiment of the present application.
Figure 3:
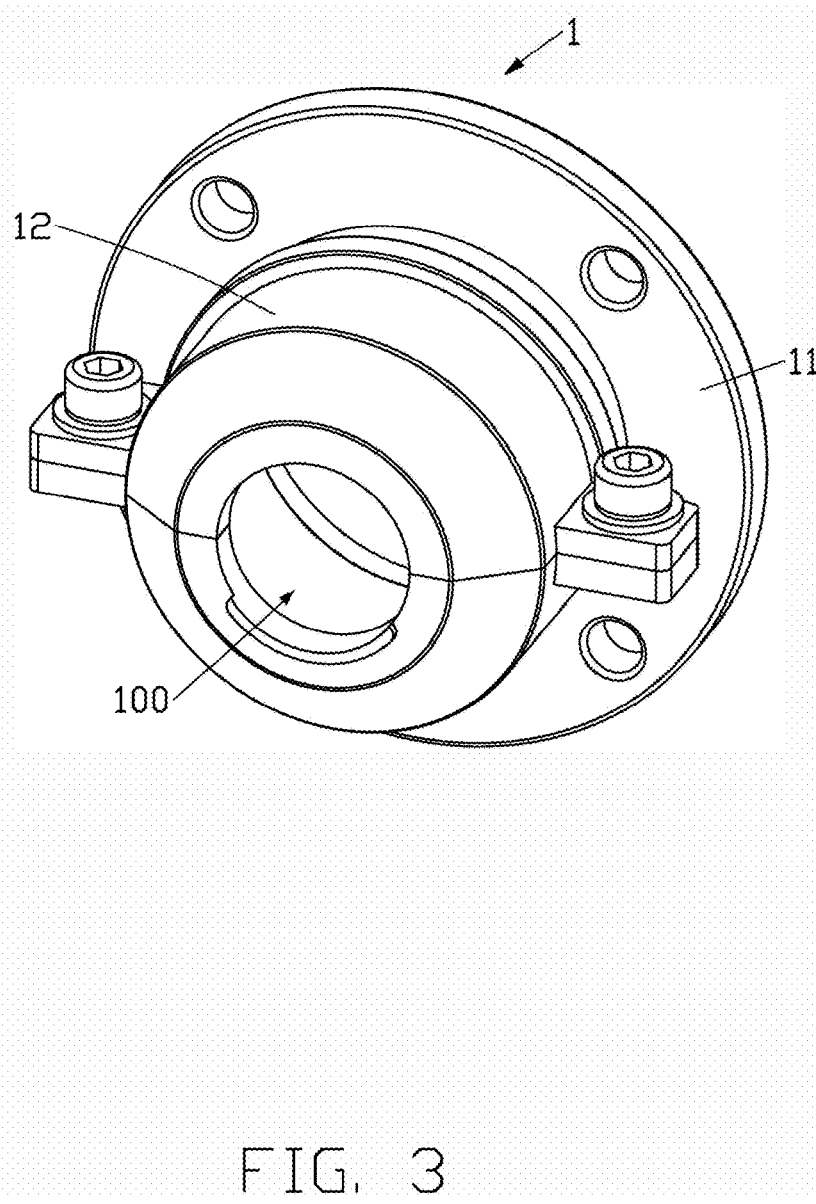
FIG. 3 is a structural schematic diagram of the sealing workpiece according to an embodiment of the present application.
Figure 4:
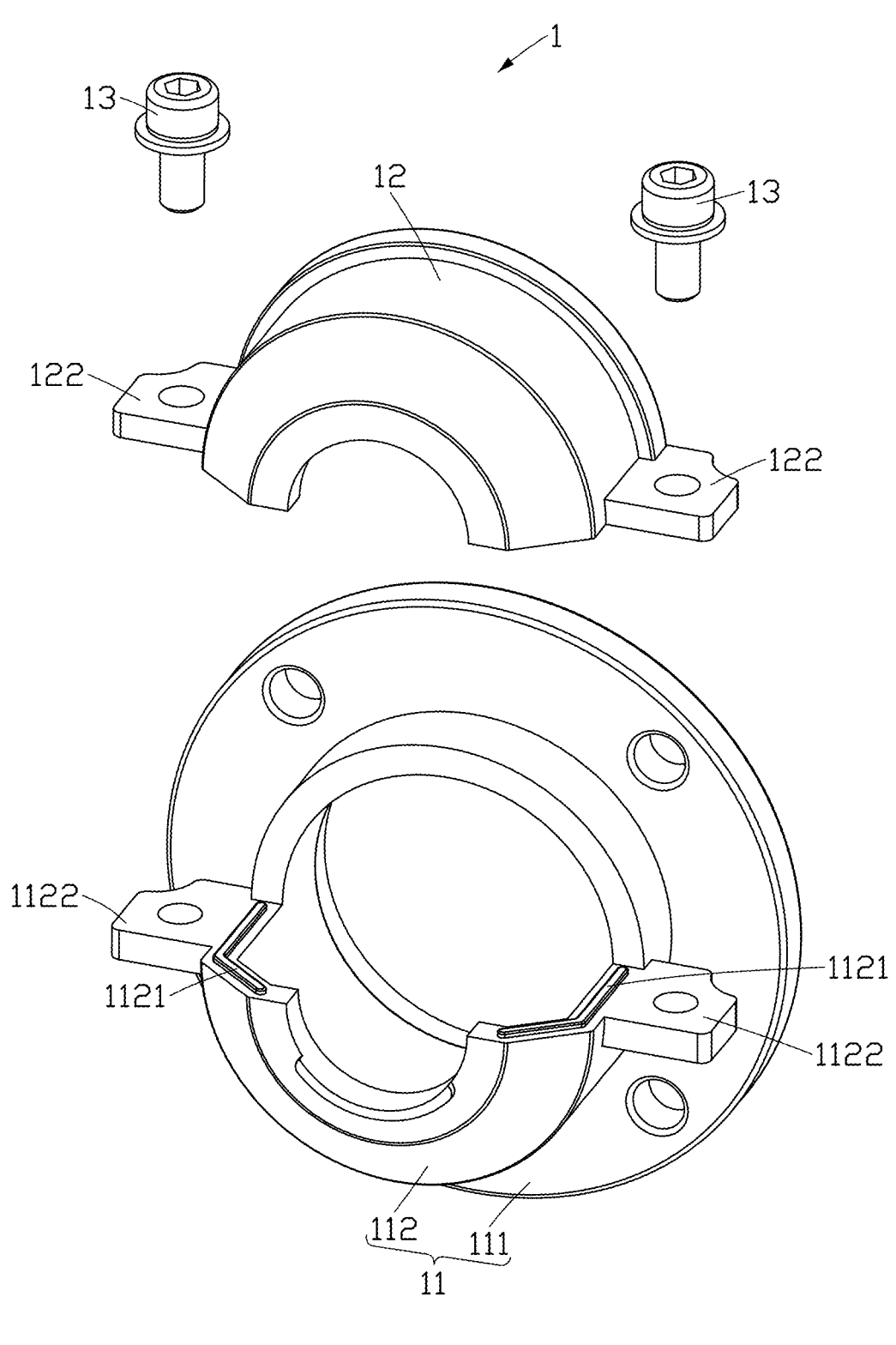
FIG. 4 is a structural explosion schematic diagram of the sealing workpiece according to an embodiment of the present application.

FIG. 1 is a schematic diagram of an application scenario of a sealing workpiece and a piece of vacuum testing equipment according to an embodiment of the present application. FIG. 2 is a schematic diagram of an application scenario of a sealing workpiece according to an embodiment of the present application. FIG. 3 is a structural schematic diagram of the sealing workpiece according to an embodiment of the present application. FIG. 4 is a structural explosion schematic diagram of the sealing workpiece according to an embodiment of the present application.

As shown in FIG. 1 and FIG. 2, an embodiment of the present application provides a sealing workpiece 1, which is applied to a piece of vacuum testing equipment 2, and the piece of vacuum testing equipment 2 is used to provide a vacuum or low pressure environment. The item to be tested can be subjected to a high-altitude drop or pressure resistance testing in the piece of vacuum testing equipment 2. The piece of vacuum testing equipment 2 may include a body 201, the body 201 may define an external connection hole 202, and wires of the peripheral equipment (such as an electrical parameter monitoring device) may be connected to the item to be tested in the piece of vacuum testing equipment 2 through the external connection hole 202, thereby the item to be tested may be subjected to a high-altitude drop test or a pressure resistance testing when the item to be tested is in a powered-on state. The sealing workpiece 1 of the embodiment of the present application may be mounted at the external connection hole 202 of the piece of vacuum testing equipment 2 to seal the external connection hole 202.

As shown in FIGS. 2 and 3, the sealing workpiece 1 may include a first cover 11 and a second cover 12. In some embodiments, the sealing workpiece 1 may be made of carbon steel (ie, medium carbon steel) with a carbon content in a range of 0.25% to 0.60%, that is, the first cover 11 and the second cover 12 may be made of carbon steel with a carbon content in a range of 0.25% to 0.60%. In some other embodiments, the sealing workpiece 1 may be made of carbon steel (ie, S45C medium carbon steel) with a carbon content in a range of 0.4% to 0.60%, that is, the first cover 11 and the second cover 12 may be made of carbon steel with a carbon content in a range of 0.4% to 0.60%. In other embodiments, the sealing workpiece 1 may also be made of other metal or alloy materials with certain hardness and ductility. In this case, the metal or alloy material with certain hardness can play a supporting role when applied to the piece of vacuum testing equipment 2 to reduce the problem of vacuum leakage caused by clay collapse, and the metal or alloy material with certain ductility can play a sealing role when applied to the piece of vacuum testing equipment 2 by automatically sticking to the surface of the metal or alloy material under a negative pressure environment to reduce the problem of vacuum leakage.

As shown in FIG. 4, the first cover 11 may include a mounting portion 111 and a joint portion 112. The mounting portion 111 may be mounted on the piece of vacuum testing equipment 2. The first cover 11 may be connected to the second cover 12 via the joint portion 112. The mounting portion 111 includes a first opening 1110 (see FIG. 5), the first opening 1110 is close to the piece of vacuum testing equipment 2, and the first opening 1110 is connected to the external connection hole 202 of the piece of vacuum testing equipment 2. The joint portion 112 includes a second opening 1120 (see FIG. 5) communicated with the first opening 1110, and the second opening 1120 is away from the piece of vacuum testing equipment 2.

In some embodiments, the joint portion 112 may be formed integrally with the mounting portion 111. In this case, the supporting function of the first cover 11 may be enhanced.

Figure 5:
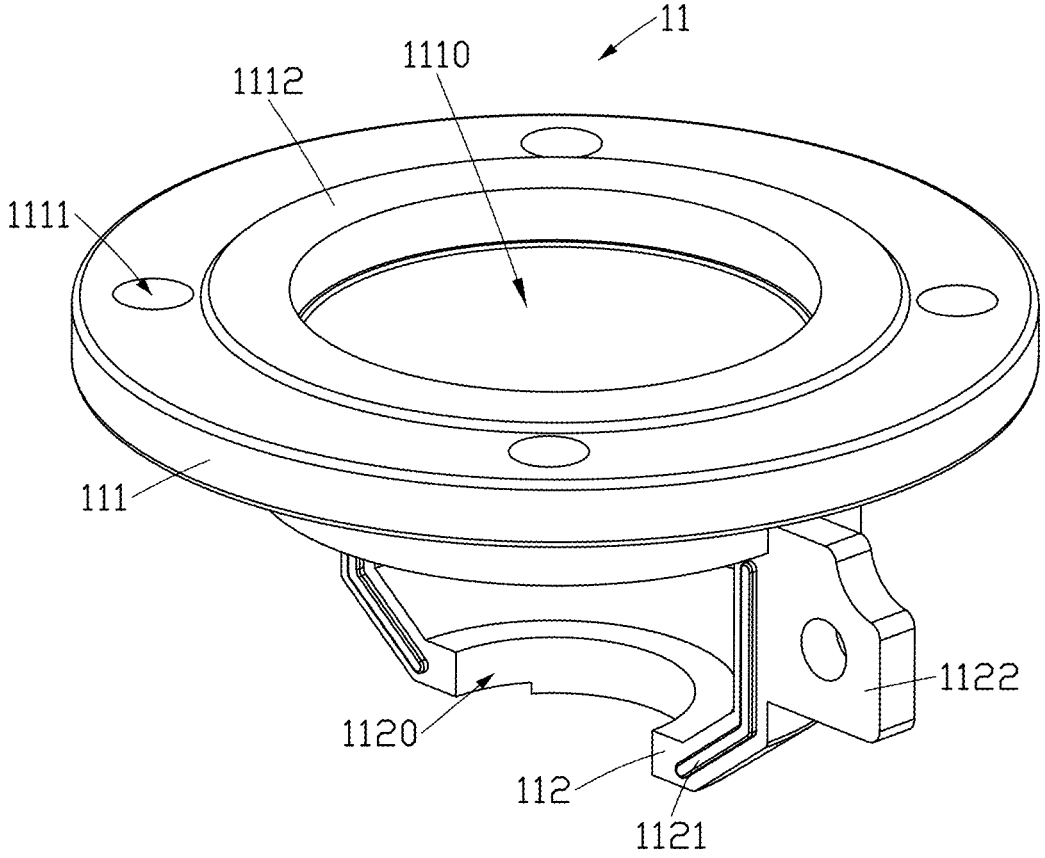
FIG. 5 is a structural schematic diagram of a first cover according to an embodiment of the present application from a first perspective.
Figure 6:
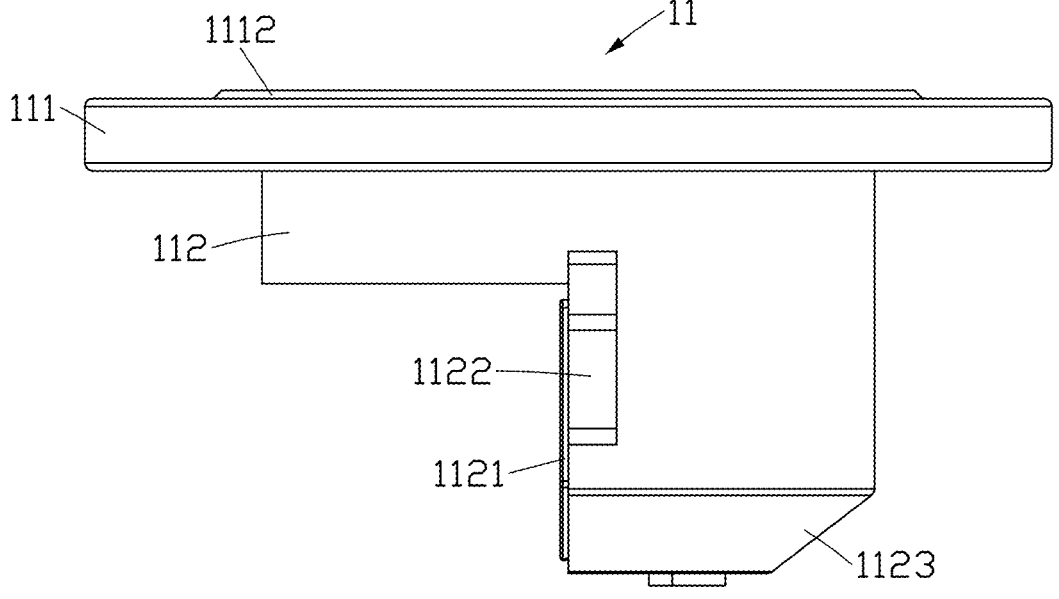
FIG. 6 is a structural schematic diagram of the first cover according to an embodiment of the present application from a second perspective.

FIG. 5 is a structural schematic diagram of the first cover 11 according to an embodiment of the present application from a first perspective. FIG. 6 is a structural schematic diagram of the first cover 11 according to an embodiment of the present application from a second perspective.

In some embodiments, as shown in FIG. 5, the shape and size of the first opening 1110 may be substantially the same as the shape and size of the external connection hole 202 of the piece of vacuum testing equipment 2. As shown in FIG. 4, the second opening 1120 may be in the shape of a larger notch. In this case, after the first cover 11 is mounted on the piece of vacuum testing equipment 2, the wires of the peripheral equipment can be connected to the item to be tested in the piece of vacuum testing equipment 2 through the second opening 1120 of the first cover 11 and then through the first opening 1110 and the external connection hole 202 of the piece of vacuum testing equipment 2, so that the wires of the peripheral equipment can be connected to the item to be tested, which can reduce the inconvenience of using a large amount of clay.

As shown in FIG. 3, when the first cover 11 and the second cover 12 are connected, the first cover 11 and the second cover 12 can cooperate to form a third opening 100 communicated with the first opening 1110. The third opening 100 is away from the piece of vacuum testing equipment 2, and a diameter of the third opening 100 is smaller than a diameter of the first opening 1110. In this case, after the wire is connected to the item to be tested in the piece of vacuum testing equipment 2, the second cover 12 is connected to the joint portion 112 of the first cover 11 to form the third opening 100 with a diameter smaller than the first opening 1110. The wire then passes through the third opening 100 to connect to the peripheral equipment. At this time, a very small amount of clay is used to fill the third opening 100 to achieve a sealing effect. Thus, the first cover 11 and the second cover 12 can form the sealing workpiece 1 for replacing most of the clay, which can not only reduce the amount of clay used, reduce the operation time of the clay sealing method, improve the test efficiency, but also reduce the clay collapse and vacuum leakage problems caused by insufficient clay strength.

After the first cover 11 and the second cover 12 are connected, they can automatically stick together in a negative pressure environment with the help of the surface of the metal or alloy material. At this time, a small amount of clay is used to fill the third opening 100, and the sealing workpiece 1 and a small amount of clay can be used to seal the external connection hole 202 of the piece of vacuum testing equipment 2. In addition, since the diameter of the third opening 100 is smaller than that of the first opening 1110, after the wire passes through, the first opening 1110 and external connection hole 202 can be sealed by a sealing ring, such as a rubber strip. The gap of the third opening 100 is already smaller after the wire passes through. At this time, sealing can be achieved by filling the third opening 100 with very little clay.

In some embodiments, as shown in FIG. 4 or FIG. 5, the mounting portion 111 has a plurality of mounting screw holes 1111 disposed toward the piece of vacuum testing equipment 2. For example, a number of the mounting screw holes 1111 may be 2, 3, 4 or more, and the plurality of mounting screw holes 1111 may be evenly distributed on the mounting portion 111. The mounting portion 111 is mounted on the piece of vacuum testing equipment 2 through the mounting screw holes 1111. Specifically, when the mounting portion 111 needs to be mounted on the piece of vacuum testing equipment 2, the mounting portion 111 is mounted on the piece of vacuum testing equipment 2 through the mounting screw holes and the screws adapted to the mounting screw holes. In this case, on the one hand, the mounting portion 111 can be stably mounted on the piece of vacuum testing equipment 2, and on the other hand, the mounting portion 111 can be fastened to the piece of vacuum testing equipment 2 to reduce the problem of vacuum leakage.

In some embodiments, as shown in FIG. 4, the joint portion 112 may have a protrusion 1121, and the protrusion 1121 may be arranged along at least a portion of the surface of the joint portion 112 that contacts the second cover 12. There may be multiple protrusions 1121. For example, two protrusions 1121 may be respectively arranged along at least a portion of the surface of the joint portion 112 that contacts the second cover 12.

Correspondingly, the second cover 12 has a groove 121 (see FIG. 7) adapted to the protrusion 1121. The groove 121 can be arranged along at least a portion of the surface of the second cover 12 that contacts the joint portion 112. There can be multiple grooves 121. For example, two grooves 121 can be arranged along at least a portion of the surface of the second cover 12 that contacts the joint portion 112.

When the first cover 11 and the second cover 12 are connected, the protrusion 1121 is embedded in the groove 121. In this case, the protrusion 1121 is embedded in the groove 121, which can improve an engagement degree and a stability of the first cover 11 and the second cover 12 after the engagement on the one hand; on the other hand, it can increase the contact surface area of the first cover 11 and the second cover 12 after the engagement, thereby improving the degree of close contact between the first cover 11 and the second cover 12 in the vacuum or low-pressure environment, thereby improving the sealing performance.

In other embodiments, the joint portion 112 includes a groove 121, and the second cover 12 includes a protrusion 1121 adapted to the groove 121. When the first cover 11 and the second cover 12 are connected, the protrusion 1121 is embedded in the groove 121. In other words, the protrusion 1121 can be provided on the first cover 11 or the second cover 12, and correspondingly, the groove 121 can be provided on the first cover 11 or the second cover 12.

Figure 7:
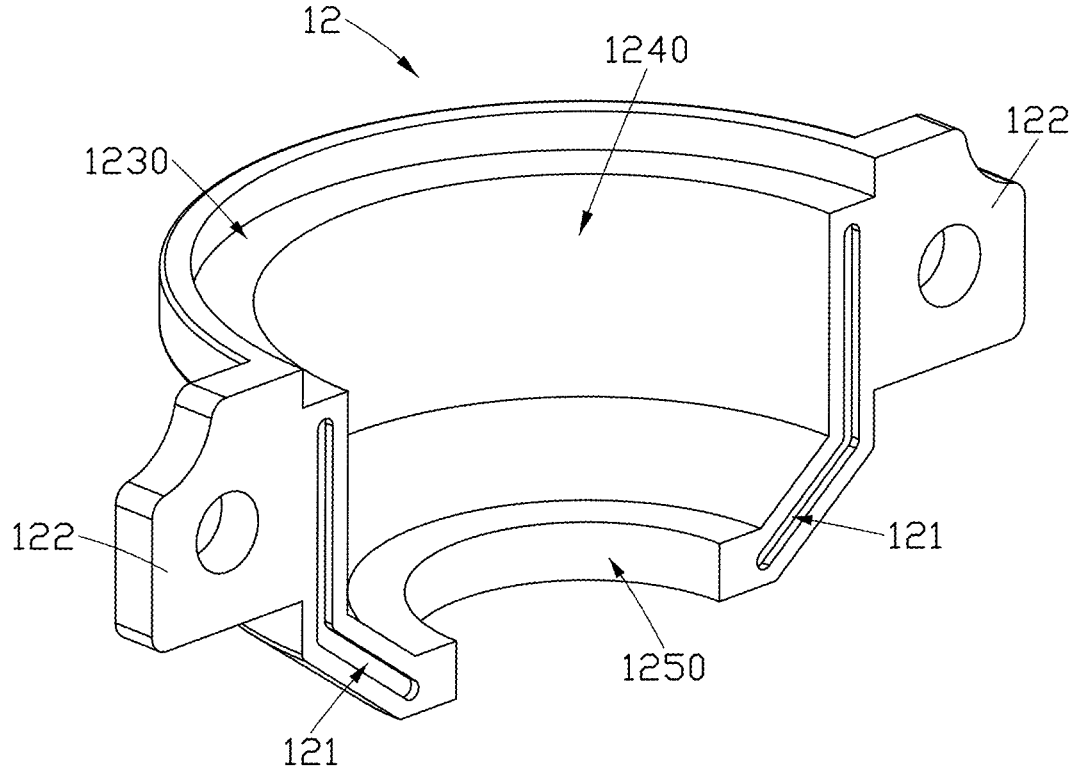
FIG. 7 is a structural schematic diagram of a second cover according to an embodiment of the present application from a first perspective.

In some embodiments, as shown in FIG. 4 or FIG. 5, the joint portion 112 may be formed with a first securing portion 1122. As shown in FIG. 4 or FIG. 7, the second cover 12 may be formed with a second securing portion 122. When the first cover 11 and the second cover 12 are connected, the first securing portion 1122 cooperates with the second securing portion 122 to stabilize the first cover 11 and the second cover 12.

In some embodiments, the first securing portion 1122 and the second securing portion 122 can be fastened by a fastener 13 to stabilize the first cover 11 and the second cover 12. The fastener 13 can be a clamping mechanism or a screw.

In some embodiments, the first securing portion 1122 may have screw holes, and the second securing portion 122 may also have screw holes. The first securing portion 1122 and the second securing portion 122 may be fastened by screws to stabilize the first cover 11 and the second cover 12.

In some embodiments, as shown in FIG. 5 or FIG. 6, a flange 1112 may be formed on one side of the mounting portion 111 close to the piece of vacuum testing equipment 2, and a diameter of the flange 1112 is equal to a diameter of the external connection hole 202. In this case, when the mounting portion 111 is mounted on the piece of vacuum testing equipment 2, the flange 1112 may be engaged with the external connection hole 202 of the piece of vacuum testing equipment 2 to form another barrier to block vacuum leakage, thereby reducing the problem of vacuum leakage from the joint between the mounting portion 111 and the external connection hole 202 when the mounting portion 111 is mounted on the piece of vacuum testing equipment 2.

The diameter of the flange 1112 is equal to the diameter of the external connection hole 202, which means that in an ideal case, the diameter of the cylindrical flange 1112 is exactly equal to the diameter of the external connection hole 202, so that the flange 1112 can fit together to reduce leakage. In actual cases, the diameter of the flange 1112 can be slightly smaller than the diameter of the external connection hole 202. At this time, under the action of vacuum pressure, the surface of the flange 1112 can also be tightly attached to the external connection hole 202 to form a sealed contact due to the ductility of the flange 1112 itself after contacting the external connection hole 202.

In other embodiments, the flange 1112 may also be in a truncated cone-shaped, and the end of the flange 1112 with a smaller diameter is close to the external connection hole 202, and the end of the flange 1112 with a larger diameter is formed at the mounting portion 111. The minimum diameter of the truncated cone-shaped flange 1112 may be less than or equal to the diameter of the external connection hole 202, and the maximum diameter may be greater than the diameter of the external connection hole 202. In this case, the flange 1112 can be directly introduced into the external connection hole 202 by the inclined side surface of the flange 1112, and can directly use the inclined side surface to tightly contact the external connection hole 202, thereby also playing a sealing role.

Figure 8:
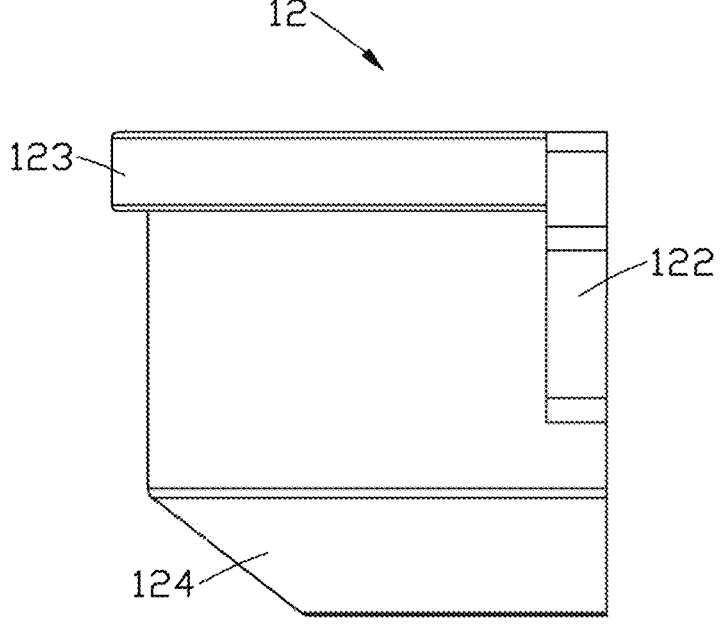
FIG. 8 is a structural schematic diagram of the second cover according to an embodiment of the present application from a second perspective.

In some embodiments, as shown in FIG. 6, an end of the joint portion 112 away from the piece of vacuum testing equipment 2 forms an inclined first slope portion 1123. As shown in FIG. 8, an end of the second cover 12 away from the piece of vacuum testing equipment 2 forms an inclined second slope portion 124. When the first cover 11 and the second cover 12 are connected, the first slope portion 1123 cooperates with the second slope portion 124 to form the third opening 100 (i.e., as shown in FIG. 3). In this case, the third opening 100 formed by the cooperation of the first slope portion 1123 and the second slope portion 124 can make the diameter of the third opening 100 smaller than the diameter of the first opening 1110, and the third opening 100 can be adapted to allow the wire to pass through, thereby reducing the gap, when the gap is small, sealing can be achieved by filling the third opening 100 with a very small amount of clay.

FIG. 7 is a structural schematic diagram of the second cover 12 according to an embodiment of the present application from a first perspective. FIG. 8 is a structural schematic diagram of the second cover 12 according to an embodiment of the present application from a second perspective.

In some embodiments, as shown in FIG. 7 or FIG. 8, the second cover 12 is formed with an entablature portion 123 at least partially engaged with the joint portion 112 at one end close to the piece of vacuum testing equipment 2. The entablature portion 123 may cover a portion of the surface of the joint portion 112. In this case, on the one hand, the entablature portion 123 may facilitate the assembly of the second cover 12 to the joint portion 112, and on the other hand, the entablature portion 123 may also increase the contact surface between the second cover 12 and the joint portion 112 to enhance the sealing effect.

In some embodiments, the edges of the sealing workpiece 1 can be configured as bevels. In this case, the comfort of the sealing workpiece 1 in the hands of the operator can be improved, so that the operator can more quickly mount the sealing workpiece 1 on the piece of vacuum testing equipment 2 or remove the sealing workpiece 1 from the piece of vacuum testing equipment 2.

In summary, in the sealing workpiece 1 of the embodiment of the present application, the first cover 11 can be mounted on the piece of vacuum testing equipment 2 through the mounting portion 111. When the wires of the peripheral equipment are connected to the item to be tested in the piece of vacuum testing equipment 2, the wires can pass through the second opening 1120 of the joint portion 112 and the first opening 1110 of the mounting portion 111, and then pass through the external connection hole 202 of the piece of vacuum testing equipment 2 to enter the piece of vacuum testing equipment 2. After that, the second cover 12 is connected to the joint portion 112 of the first cover 11 to form a direct third opening 100 with a diameter smaller than the first opening 1110. The wires then pass through the third opening 100 to be connected to the peripheral equipment. At this time, a very small amount of clay is used to fill the third opening 100 to achieve a sealing effect. Thus, the first cover 11 and the second cover 12 can form the sealing workpiece 1 for replacing most of the clay, which can reduce the amount of clay used, reduce the operation time of the clay sealing method, improve the test efficiency, and reduce the clay collapse and vacuum leakage problems caused by insufficient clay strength. In other words, the first cover 11 and the second cover 12 are separated (or "detachable") to facilitate wire assembly, and the first cover 11 and the second cover 12 are connected to play a supporting and sealing role, reducing the use of clay and reducing vacuum leakage problems.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A sealing workpiece applied to a piece of vacuum testing equipment, the sealing workpiece comprising:
   a first cover, comprising a mounting portion and a joint portion integrally formed with the mounting portion, the mounting portion mounted to the vacuum testing equipment, the mounting portion comprising a first opening, the first opening closing to the vacuum testing equipment, the first opening communicated with an external connection hole of the vacuum testing equipment, the joint portion comprising a second opening communicated with the first opening, the second opening being away from the vacuum testing equipment; and
   a second cover, the first cover connected to the second cover through the joint portion,
   wherein in a case that the first cover and the second cover are connected, the first cover and the second cover engage to form a third opening communicating with the first opening, the third opening is away from the vacuum testing equipment, a diameter of the third opening is less than a diameter of the first opening;
   the joint portion comprises a protrusion, the protrusion is arranged along a surface of the joint portion that contacts the second cover, the second cover comprises a groove matching with the protrusion, the groove is arranged along a surface of the second cover that contacts the joint portion, in a case that the first cover and the second cover are connected, the protrusion is embedded in the groove.

2. The sealing workpiece according to claim 1, wherein the joint portion comprises a first securing portion, the second cover comprises a second securing portion, when the first cover and the second cover are connected, the first securing portion and the second securing portion are engaged to secure the first cover and the second cover.

3. The sealing workpiece according to claim 1, wherein the mounting portion comprises a flange on a side close to the piece of vacuum testing equipment, a diameter of the flange is equal to a diameter of the external connection hole.

4. The sealing workpiece according to claim 1, wherein the joint portion comprises an inclined first slope portion on an end away from the piece of vacuum testing equipment, the second cover comprises an inclined second slope portion on an end away from the piece of vacuum testing equipment, when the first cover and the second cover are connected, the first slope portion and the second slope portion engage to form the third opening.

5. The sealing workpiece according to claim 1, wherein the second cover comprises an entablature portion on an end close to the vacuum testing equipment, the entablature portion is embedded at least a part of the joint portion.

6. The sealing workpiece according to claim 1, wherein the mounting portion comprises a plurality of mounting screw holes disposed toward the piece of vacuum testing equipment, the mounting portion is mounted to the piece of vacuum testing equipment through the plurality of mounting screw holes.

7. The sealing workpiece according to claim 1, wherein a material of the sealing workpiece is carbon steel with a carbon content in a range of 0.25% to 0.60%.

8. The sealing workpiece according to claim 1, wherein a material of the sealing workpiece is carbon steel with a carbon content in a range of 0.4% to 0.60%.

9. A piece of vacuum testing equipment comprising:
a body defining an external connection hole; and
a sealing workpiece comprising:
a first cover, comprising a mounting portion and a joint portion integrally formed with the mounting portion, the mounting portion mounted to the body, the mounting portion comprising a first opening, the first opening closing to the body, the first opening communicated with the external connection hole, the joint portion comprising a second opening communicated with the first opening, the second opening being away from the body;
a second cover, the first cover connected to the second cover through the joint portion;
wherein when the first cover and the second cover are connected, the first cover and the second cover engage to form a third opening communicating with the first opening, the third opening is away from the body, a diameter of the third opening is less than a diameter of the first opening;
the joint portion comprises a protrusion, the protrusion is arranged along a surface of the joint portion that contacts the second cover, the second cover comprises a groove matching with the protrusion, the groove is arranged along a surface of the second cover that contacts the joint portion, in a case that the first cover and the second cover are connected, the protrusion is embedded in the groove.

10. The vacuum testing equipment according to claim 9, wherein the joint portion comprises a first securing portion, the second cover comprises a second securing portion, when the first cover and the second cover are connected, the first securing portion and the second securing portion are engaged to secure the first cover and the second cover.

11. The vacuum testing equipment according to claim 9, wherein the mounting portion comprises a flange on a side close to the body, a diameter of the flange is equal to a diameter of the external connection hole.

12. The vacuum testing equipment according to claim 9, wherein the joint portion comprises an inclined first slope portion on an end away from the body, the second cover comprises an inclined second slope portion on an end away from the body, when the first cover and the second cover are connected, the first slope portion and the second slope portion engage to form the third opening.

13. The vacuum testing equipment according to claim 9, wherein the second cover comprises an entablature portion on an end close to the body, the entablature portion is embedded at least a part of the joint portion.

14. The vacuum testing equipment according to claim 9, wherein the mounting portion comprises a plurality of mounting screw holes disposed toward the body, the mounting portion is mounted to the body through the plurality of mounting screw holes.

15. The vacuum testing equipment according to claim 9, wherein a material of the sealing workpiece is carbon steel with a carbon content in a range of 0.25% to 0.60%.

16. The vacuum testing equipment according to claim 9, wherein a material of the sealing workpiece is carbon steel with a carbon content in a range of 0.4% to 0.60%.

* * * * *